United States Patent [19]

Servant

[11] Patent Number: 5,620,219
[45] Date of Patent: Apr. 15, 1997

[54] RETRACTABLE ARTICULATED FRONT PROTECTIVE FENCE FOR SCHOOL BUS

[76] Inventor: Jean-Hugues Servant, 1999 St-Charles sud, Granby, Québec, Canada, J2G 8C6

[21] Appl. No.: 621,931

[22] Filed: Mar. 26, 1996

[51] Int. Cl.⁶ ..................................................... B60R 11/48
[52] U.S. Cl. ........................ 293/117; 293/118; 293/142; 116/28 R
[58] Field of Search ................................... 293/102, 117, 293/118, 142, 9; 116/28 R; 256/26

[56] References Cited

U.S. PATENT DOCUMENTS

| | | | |
|---|---|---|---|
| 3,236,552 | 2/1966 | Percifull | 293/118 X |
| 4,697,541 | 10/1987 | Wicker | 116/28 R |
| 5,226,686 | 7/1993 | Triggs et al. | 293/117 |

*Primary Examiner*—Dennis H. Pedder
*Attorney, Agent, or Firm*—François Martineau

[57] ABSTRACT

The protective fence of the invention comprises a first and a second arms that are pivoted at the opposite ends of a frame member that is placed in lieu of the bumper of a school bus. When children are entering or exiting the school bus, the bus driver can activate the arms that alternately pivot into an outwardly-projecting extended position. The arms are linked at their outer ends by a foldable band that is stretched between the two arms. The area directly in front of the school bus hood is circumscribed by the arms and the foldable band, and is thus not readily accessible by any of the children. Consequently, it is much less likely that a child will stand in this area in front of the school bus hood when the bus driver drives off, and disastrous accidents can be avoided.

11 Claims, 6 Drawing Sheets

RETRACTABLE ARTICULATED FRONT PROTECTIVE FENCE FOR SCHOOL BUS

FIELD OF THE INVENTION

The present invention relates to a protective fence for school bus, and more particularly to a retractable articulated front protective fence for school bus.

BACKGROUND OF THE INVENTION

Young children quickly understand that the shortest way between two points is a straight line. However, the path thus followed can be a very dangerous one. Indeed, children who travel to school in a school bus will often enter their school bus or exit therefrom by walking straight ahead of the school bus, with the bus hood being higher than the children. This will cause the bus driver not to see them in front of his vehicle, and can thus result in the bus hitting a school student or running him over.

To avoid such dire consequences, it is known to install a fence on the front end of the school bus to prevent the children from walking in the "blind spot" of the bus driver, i.e. where he cannot see them, right in front of his bus hood. The purpose of such a fence is thus to compel the children to walk around it, and consequently around the blind spot of the bus driver.

One such safety fence is disclosed in U.S. Pat. No. 4,697,541 issued in 1987 to J. H. Wicker. The fence or control arm of this patent is mounted on a frame attached to the bumper of the school bus, and comprises a U-shaped rod that pivots from a retracted position adjacent the frame to an extended position in which said rod projects outwardly away from the bumper. The pivoting axis is positioned at the end of the bumper which is nearer the front door of the school bus. When a child is to be picked up or dropped off, the arm is extended from its retracted position to its extended position so that the child will not walk in the driver's blind spot. The problem with this control arm is that it is still possible for a child to inadvertently roam the area at the front of the bus by accessing it from the side on which there is no control arm, and thus the danger is still present of an accident happening between the bus and a school student.

Canadian patent application No. 2,075,213, published on Feb. 6, 1994, to the present applicant, shows a safety fence that extends frontwardly from the bumper of the school bus by means of two hydraulic cylinders. The outer extremities of the piston rods of the cylinders hold a frame member on which is vertically installed a wire netting. An accordion-like netting also extends parallel to each cylinder, originating over each end of the bumper. The netting encases the cylinders and prevents easy passage to the blind spot at the front end of the school bus. A problem with this invention is that the long cylinders are heavy, and thus the power needed to operate the system is much greater and the production cost is higher. Also, the long cylinders can be possibly dangerous if a child puts his hands on them during their operation.

OBJECTS OF THE INVENTION

It is the gist of this invention to provide a protective fence for a school bus, that will prevent passage of children ahead of the bus hood where the bus driver cannot see them.

It is an important object of this invention that the protective fence be light and of simple construction.

SUMMARY OF THE INVENTION

In accordance with the objects of the invention, there is disclosed a protective fence for use ahead of a school bus defining a front end, said protective fence comprising:

a) an elongated frame member, destined to be securingly attached horizontally to the school bus front end;

b) a first and a second elongated lightweight arms having respective inner and outer ends, said inner ends being pivotally attached to opposite ends of said elongated frame member for pivoting movement of said first and second arms between respective retracted and extended positions around respective laterally spaced-apart parallel pivoting axes;

c) power means, carried by said frame member, for selectively pivoting said first and second arms sequentially from said retracted to said extended position and from said extended to said retracted position; and d) a foldable semi-rigid lightweight band attached, in an articulated fashion, to the respective outer ends of said first and second arms;

said first and second arms being adjacent to said frame member at said retracted position, with said first arm overlapping said second arm, and projecting away from said frame member at said extended position; wherein a lightweight fence assembly is formed in ground overhanging fashion in said extended position.

The present invention further discloses a method of use of a protective fence for mounting ahead of a school bus, the fence comprising a pair of first and second elongated arms pivotally mounted at their inner ends to opposite ends of an elongated support frame and supporting at their outer ends a foldable strip, the support frame being carried horizontally against the school bus front end, and a power output assembly carried by the support frame; said method comprising the following steps:

a) energizing said power assembly;

b) pivoting said first arm away from said support frame, from a position approximately parallel to the support frame to an operative position substantially transverse thereto;

c) pivoting said second arm away from said support member, from a position approximately parallel to the support frame to an operative position substantially transverse thereto, while concurrently allowing said foldable strip to tilt half a turn in the process, to bring same from an extended position closely adjacent and about parallel to said support frame to an extended farthest ahead from said support frame, wherein said fence occupies an operative condition;

d) pivoting back said second arm inwardly toward and against said support frame; and e) pivoting back said second arm inwardly toward and against said second arm while concurrently allowing said foldable strip to again tilt half a turn in the process, to return to its position closely adjacent and about parallel to said support frame.

DETAILED DESCRIPTION OF THE EMBODIMENTS

Figure 1:
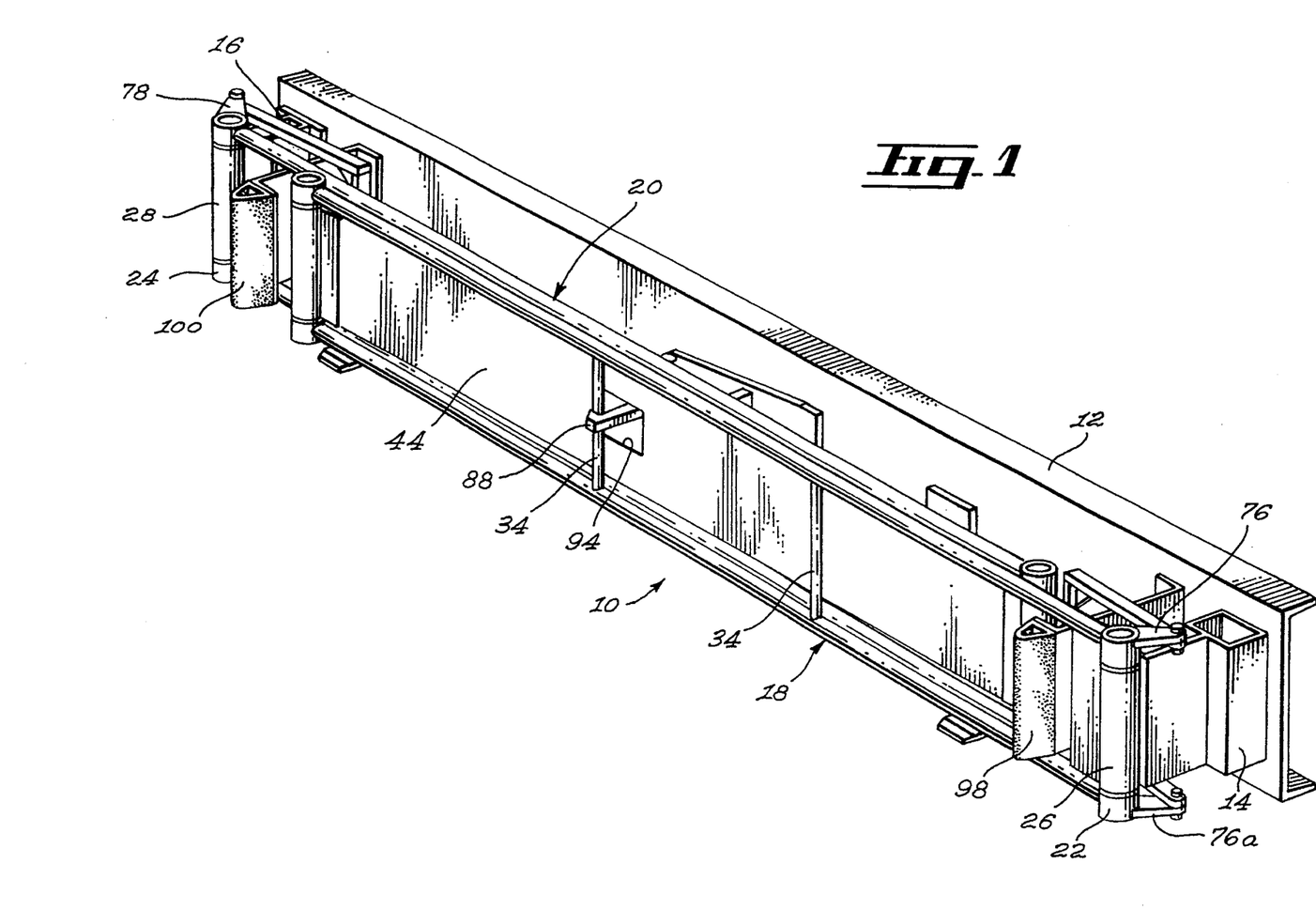
FIG. 1 is a right perspective view of the preferred embodiment of the protective fence in accordance with the invention, in its retracted position.

FIG. 1 shows a protective fence 10 for school bus comprising a frame member 12 which is destined to be fixedly attached at the front end of a school bus, to replace the front bumper, and thus in a horizontal fashion.

Figure 2:
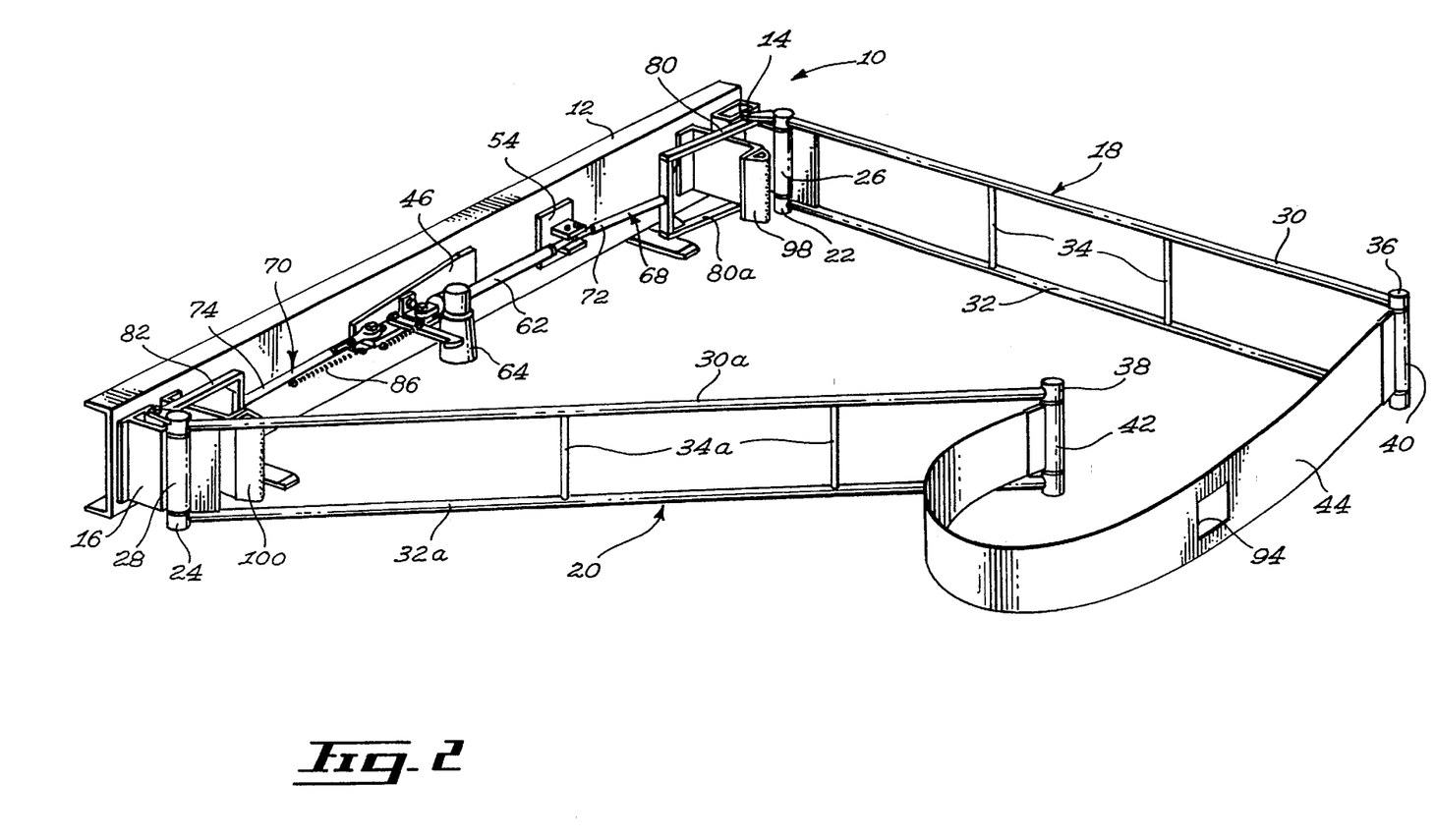
FIG. 2 is a left perspective view of the protective fence of FIG. 1, with the arms partially outstretched.
Figure 3:
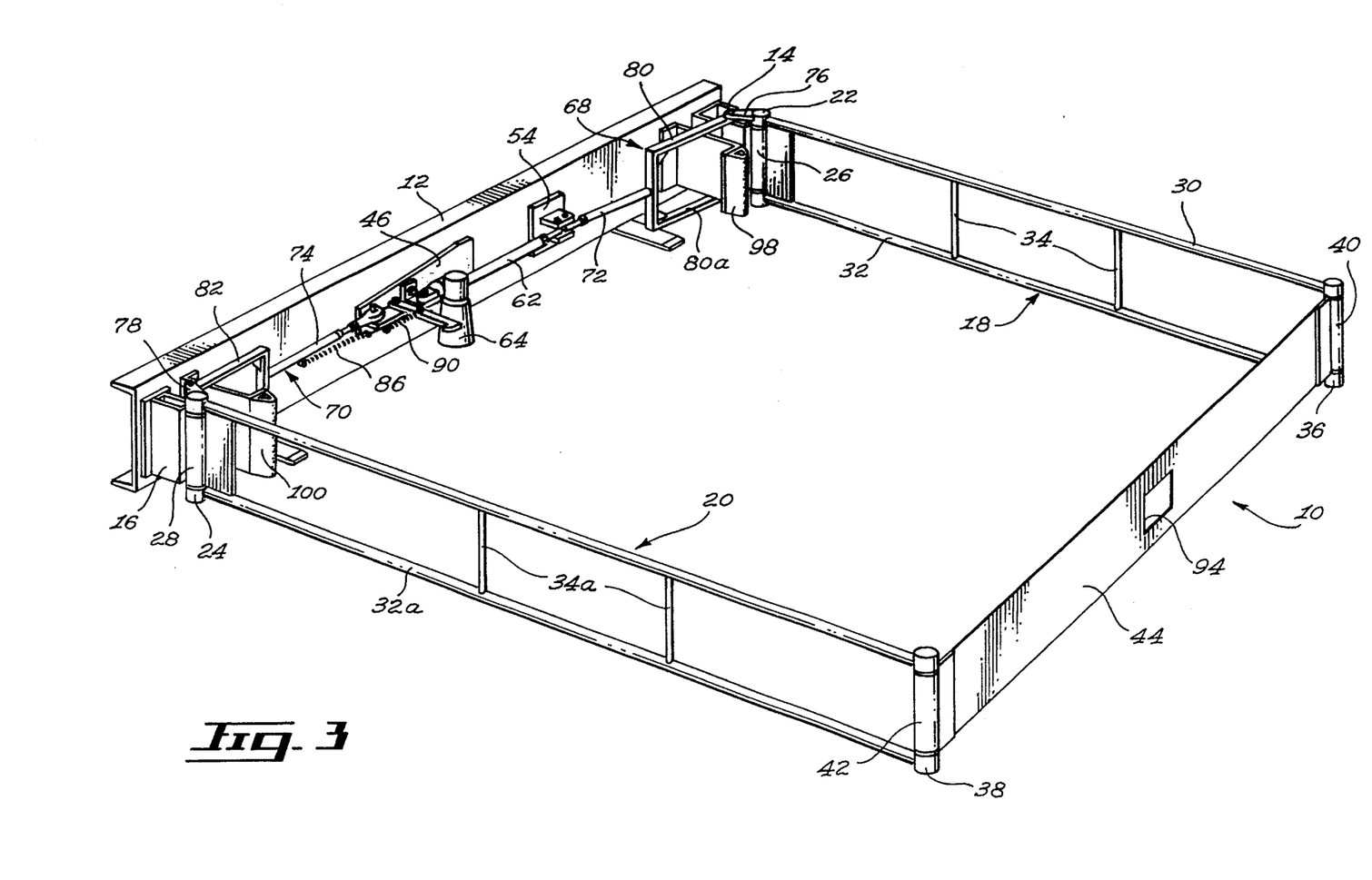
FIG. 3 is a left perspective view of the protective fence of FIGS. 1 and 2, in its fully extended position.

FIGS. 1 to 3 show that first and second arm supports 14 and 16 are fixedly installed at one and the other ends of frame member 12 and hold spacedly outwardly therefrom first and second elongated arms 18 and 20. The attachment of arms 18 and 20 to their respective arm supports 14 and 16 allows them to pivot in a plane parallel to the frame member 12 longitudinal axis, i.e. they can pivot in a horizontal plane, due to inner pivot pins 22 and 24 which can rotate in sleeves 26 and 28 that are integrally attached at the outer ends of arm supports 14, 16. Support 14 is formed of two rectangular-sectioned pieces and is longer than support 16, which is formed of only one such piece, first arm 18 thus being slightly offset further away from frame member 12 relative to second arm 20.

Arms 18, 20 each have an upper and a lower longitudinal rod 30, 30a and 32, 32a respectively, and several crossbars 34, 34a (two crossbars 34 as shown in the drawings) transversely linking rods 30, 32 and 30a, 32a for structural integrity of arms 18, 20. Upper and lower longitudinal rods 30, 30a and 32, 32a are attached at the extremities of a corresponding one of pivot pins 22, 24 which axially protrude beyond their corresponding sleeve 26, 28, on one side and the other thereof. Arms 18 and 20 each carry an outer pivot pin 36, 38 at their outer ends, which rotatably engages a corresponding sleeve 40, 42 at their extremity opposite pivot pins 22, 24. Sleeves 40, 42 are integrally attached to the extremities of a semi-rigid foldable elongated band 44.

Band 44 is preferably rectangular and made from a fibre-reinforced plastic material which will grant it an enhanced directional resistance, to prevent band 44 from bending downwards around a horizontal axis under its own weight but to allow a relatively easy bending around a vertical axis (as shown in FIG. 2). This plastic material also has the advantage of being of light weight. Preferably, the upper and lower edges of band 44 are lined with a metallic wire, to help prevent bending of band 44 around a horizontal axis.

Arms 18 and 20 can be pivoted between a fully retracted position, shown in FIG. 1, and a fully extended position, shown in FIG. 3. FIG. 2 shows an intermediate partly extended position between the extended and the retracted positions. In their fully retracted position, first and second arms 18 and 20 are parallel to frame member 12 and spacedly adjacent thereto, with first arm 18 overlapping second arm 20, the outer end of each arm being near the inner end of the other arm; since first arm 18 is supported further away from frame member 12 than second arm 20, this overlapping still allows each arm 18, 20 to be parallel to frame member 12 (as suggested in FIG. 2). During their pivoting movement, band 44 will fold around a vertical axis to allow the arms 18, 20 to pivot freely in sleeves 26, 28 of arm supports 14, 16. Also, sleeves 40, 42 will rotate around outer pivot pins 36, 38 to allow the extremities of flexible band 44 to orient themselves during the pivoting movement of arms 18, 20. When first and second arms 18, 20 reach their extended position, they will be projecting away from frame member 12 and band 44 will be stretched straight between them.

Thus, when frame member 12 is installed instead of a bus bumper, the outwardly projecting arms 18 and 20, together with band 44 linking their outer extremities, form a visible quadrangular barrier that will circumscribe—and obstruct the passage to—the area directly ahead of the bus hood and which will consequently help prevent children from walking in the blind spot of the bus driver. This blind spot is indeed surrounded on all sides by the arms 18, 20, by band 44 and by the bus itself. Thus, there is no easy access to this area, unless the children crawl under the rigid arms 18, 20 or the flexible band 44.

FIGS. 2 and 3 further show the mechanism for moving arms 18, 20 from their retracted to their extended position. This mechanism is also illustrated in FIGS. 4 to 7, in which the different steps for extending the protective fence are sequentially suggested.

An elongated tapered plate 46 is positioned near the center portion of frame member 12. Elongated plate 46 is engaged, at each of its two extremities, by a bolt 48 (FIG. 8) which engages a sliding disc 50 having a radially enlarged head 50a. Each of the two sliding discs 50 axially and slidingly engages an ovoidal slot 52 in frame member 12, with head 50a being diametrically larger than slot 52 and bearing on the rear (back) surface 12a of frame member 12. Thus, elongated plate 46 can slide along frame member 12 between a left and a right (from the perspective of any of the FIGS. 1 to 8) limit positions defined by ovoidal slots 52, with elongated plate 46 and disc heads 50a positioned on one side and the opposite one of frame member 12.

Similarly, a short plate 54 can also slide along an ovoidal slot 56 in frame member 12 by means of a sliding disc 58 attached to short plate 54 with a bolt 60. Sliding disc 56 axially and slidingly engages ovoidal slot 56 and has a radially enlarged head that bears on the rear surface 12a of frame member 12 to securingly and slidingly hold short plate 54, which can slide along frame member 12 between a left and a right (from the perspective of any one of FIGS. 1 to 8) limit positions defined by ovoidal slot 56.

A hydraulic cylinder 62 is hingedly supported at its first extremity by elongated plate 46 and at its second extremity by short plate 54. An electric motor 64, fixed on cylinder 62 near elongated plate 46, can selectively activate cylinder 62 for extending or retracting its piston rod 66. Motor 64 may be manufactured by SKF Specialty Products (Pennyslvania, USA), model CATR 33 12 V DC.

A first and a second linking members or linking forks 68, 70 are hingedly attached on short plate 54 and elongated plate 46, respectively, with a first rod thereof 72, 74. First linking fork 68 is pivotally attached to a pair of levers 76, 76a (FIGS. 1 and 4 to 7) which radially project from and are integrally fixed to the protruding ends of pivot pin 22 of first arm 18. Likewise, second linking fork 70 is pivotally attached to a pair of levers 78, 78 (the second lever 78 not being illustrated in the drawings but being a mirror image of the first lever 78) which radially project from and are integrally fixed to the protruding ends of pivot pin 24 of second arm 20. Both linking forks 68, 70 are attached to levers 76, 76a and 78, 78 by means of two parallel rods 80, 80a and 82, 82a, which, together with first rods 72, 74, give linking forks 68, 70 a Y-shaped appearance.

Figure 8:
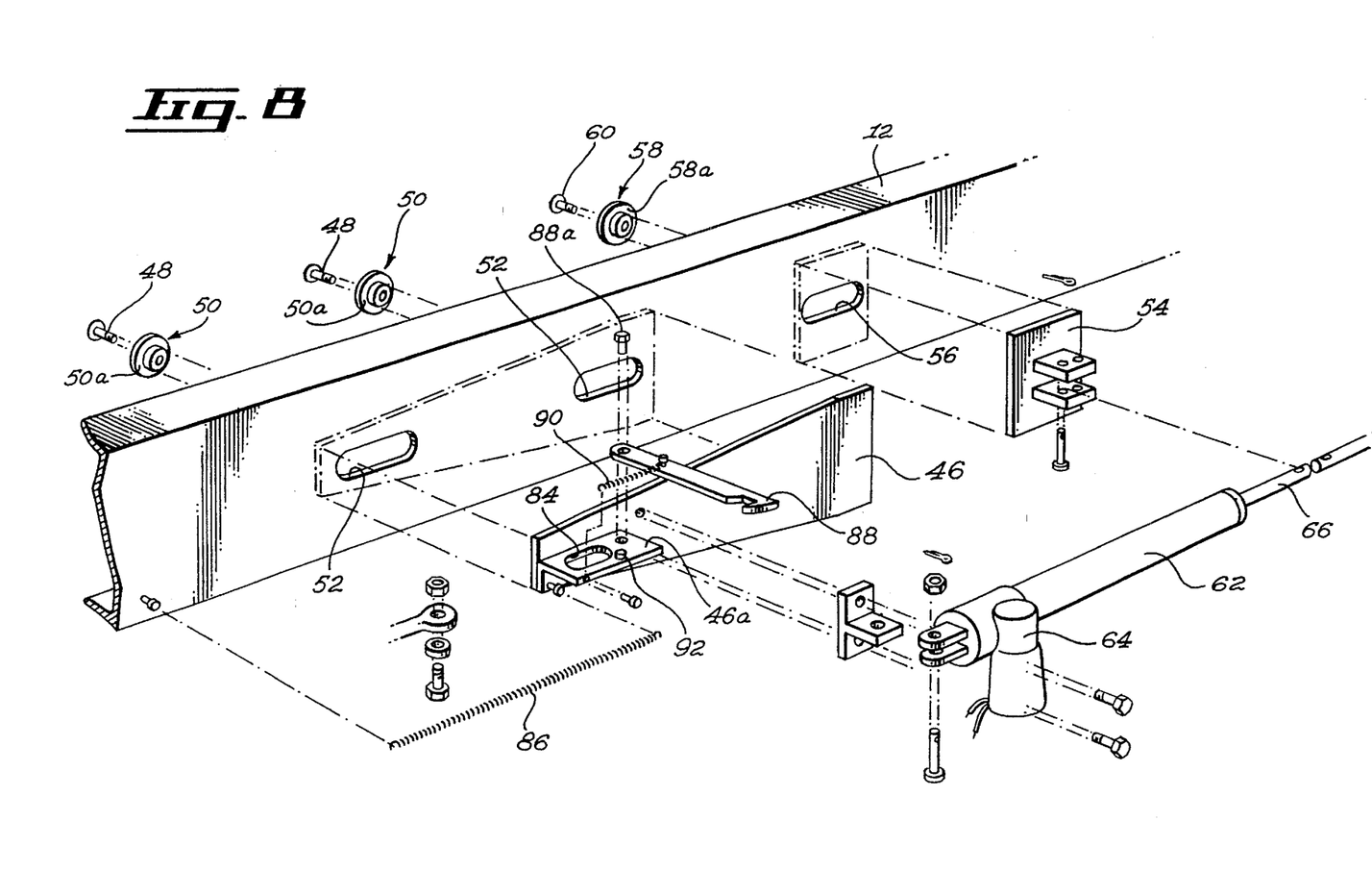
FIG. 8 is an exploded view of the central part of the frame member of the protective fence of the invention.

First rod 74 of linking fork 70 is hingedly attached to elongated plate 46 in a short ovoidal slot 84 cut into a short orthogonally and outwardly-projecting flange 46a of plate 46 and can slide therein, as shown in FIG. 8. FIG. 8 further suggests that an elongated coil spring 86 biases elongated plate 46 towards the left-hand side of the figure (thus towards the inner end 24 of second arm 20).

An elongated hook member 88 is pivotally mounted by pivot pin 88a to flange 46a of elongated plate 46 and projects outwardly therefrom. Hook member 88 is biased towards an outwardly projecting perpendicular position, relative to frame member 12, by a spring 90 and by an abutment against an abutment pin 92. When arms 18, 20 are in their retracted position, hook member 88 registers with and extends through an aperture 94 cut in the center portion of band 44 (FIG. 1), engaging in a retaining fashion one of the cross bars 34 of first arm 18 for retaining said first and second arms 18 and 20 in said retracted position. Since spring 86 biases elongated plate 46 towards its left-side position (in FIGS. 4 to 7), hook member 88 will bear on cross bar 34 of first arm 18 when no force is otherwise applied on elongated plate 46.

FIGS. 1 to 3 show that a pair of shock absorbers 98, 100 are fixedly installed at one end and the other of frame member 12, projecting orthogonally and outwardly beyond first arm 18 in its retracted position, between upper and lower rods 30, 30a and 32, 32a. Shock absorbers 98 and 100 are positioned inwardly adjacent to first and second arm supports 14 and 16, respectively, and are spaced enough to allow band 44 to be positioned between them at its full length. Thus, when first and second arms 18, 20 are at their retracted position, the arms 18, 20 are interiorly offset so that shock absorbers 98, 100 can absorb front incoming impacts without damage to the arms 18, 20.

Figure 4:
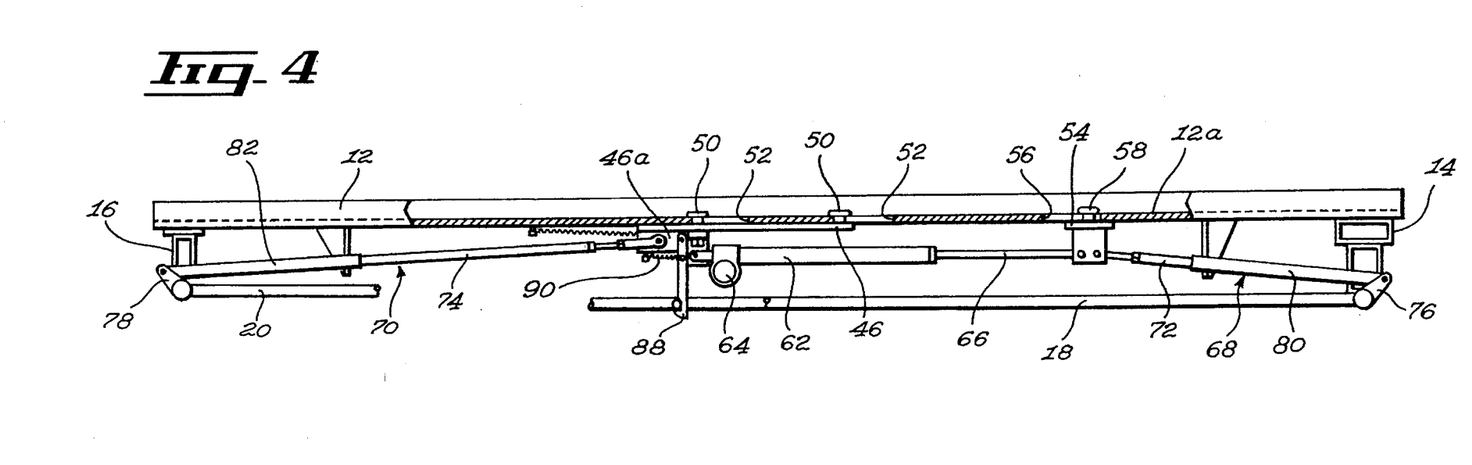
FIGS. 4 to 7 are partial top plan views, partly broken, of the protective fence of the invention, sequentially suggesting the pivoting movements of the arms from their retracted to their extended position.
Figure 5:
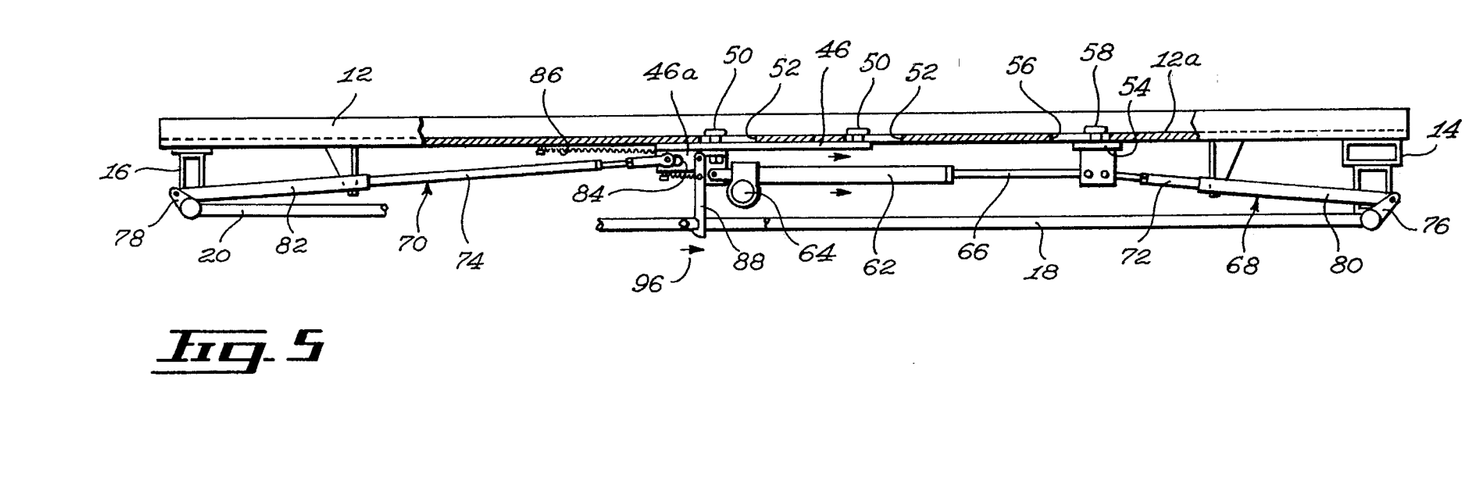

In use, at the retracted position of first and second arms 18 and 20, first arm 18 overlaps second arm 20, as illustrated in FIG. 4, and levers 76, 76a and 78, 78a are positioned angularly outwardly. In this position, first and second arms 18 and 20 are adjacent to frame member 12 and therefore do not hamper the driving of the school bus on which they are installed.

Figure 6:
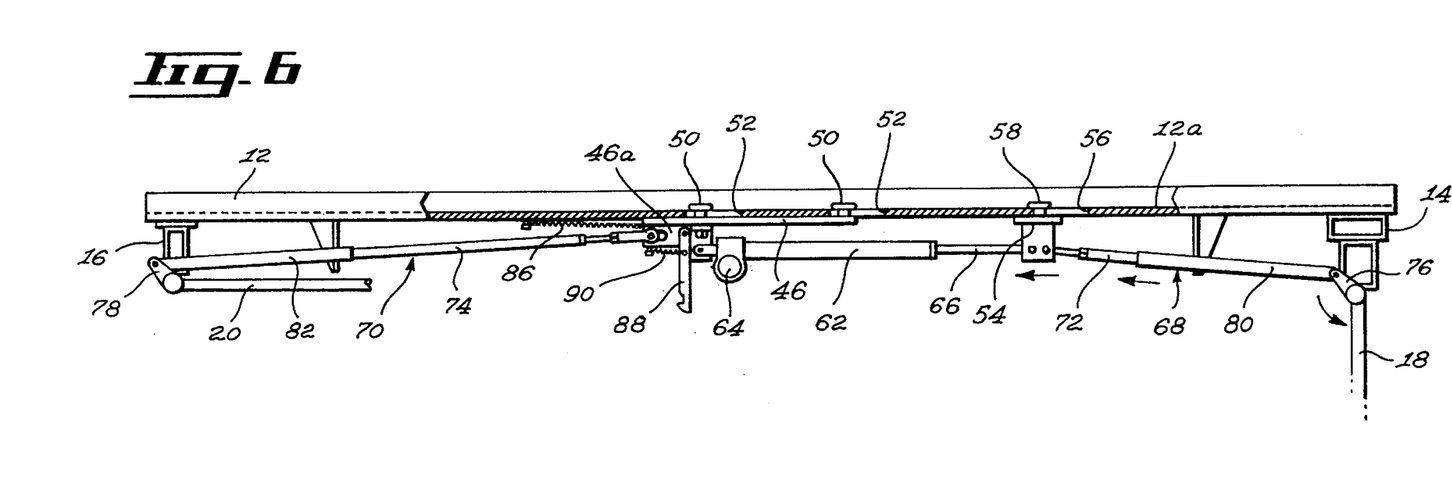
Figure 7:
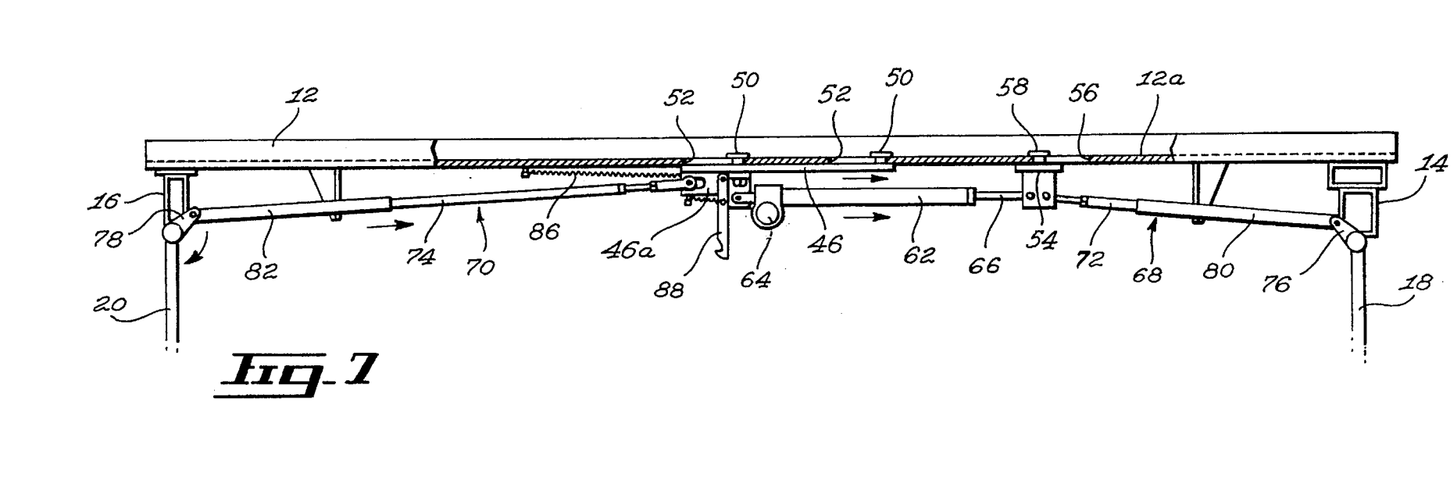

When the bus driver desires to pivot arms 18, 20 to their extended position, he activates motor 64 which in turn activates hydraulic cylinder 62 to retract piston rod 66. This will pivot first arm 18 outwardly, through the instrumentality of first linking fork 68, levers 76, 76a and pivot pin 22. Likewise, as shown in FIGS. 6 and 7, second arm 20 will pivot to its extended position since elongated plate 46 will slide towards the inner pivoted end 76 of first arm 18, and thus pivot second arm 20 through the instrumentality of linking fork 70, levers 78, 78a and pivot pin 24.

More particularly, when piston rod 66 is retracted into cylinder 62, the following sequential chain of events will occur:

a) (FIGS. 4 and 5) elongated plate 46 will slide towards short plate 54 until the pivot pin of first rod 74 of second linking fork 70 abuts on the end of ovoidal slot 84 (thus the linear displacement of elongated plate 46 is short, relative to the length of slots 52 in which it can slide). This short displacement allows hook member 88 to disengage the cross-bar 34 of first arm 18, as suggested by arrow 96 in FIG. 5;

b) (FIGS. 5 and 6) first arm 18 will pivot to its extended position before second arm 20, as suggested in FIGS. 4 to 7, so as to prevent any impact between the two arms. Indeed, although hydraulic cylinder 62 applies a simultaneous and equal force on linking forks 68, 70, the angular position of levers 76, 76a relative to first fork 68 brings a greater leverage on first arm 18 than the one issued from the angular position of levers 78, 78a relative to second linking fork 70. Therefore, since this leverage is greater, first arm 18 will be easier to pivot than second arm 20, and short plate 54 will slide towards elongated plate 46, thus pivoting first arm 18 to its extended position (the length of ovoidal slot 56 in which short plate 54 slides is correctly dimensioned for this) while second arm 20 will remain at its retracted position; and c) (FIGS. 6 and 7) when short plate 54 abuts at the end of slot 56, elongated plate 46 will slide towards short plate 54, which will pivot second arm 20 into its extended position (the length of slots 52, 52 in which elongated plate 46 slides is correctly dimensioned for this).

The opposite steps occur for the retraction of arms 18 and 20 when motor 64 is selectively activated for such a purpose: piston rod 66 is then extended out of cylinder 62. The new angular positions of levers 76, 76a and 78, 78a relative to first and second linking forks 68, 70 respectively, will confer a greater leverage to second linking fork 70 on second arm 20 than to first linking fork 68 on first arm 18, even though the force applied on linking forks 68, 70 is equal and simultaneous. Therefore, second arm 20 will pivot to its retracted position before first arm 18. When the retraction of first arm 18 is being completed, the tapered free end of hook member 88 will pass through aperture 94, will slidingly engage cross bar 34 and will be pivoted sideways, opposite abutment pin 92, until it is biased back to its outwardly-projecting position by spring 90 to securely engage cross bar 34 and hold first arm 18.

With the protective fence 10 of the invention, the blind spot ahead of the school bus is thus not readily accessible. Also, the outwardly-extending parts of the fence, namely first and second arms 18 and 20 together with band 44, are of light weight since there are no long hydraulic cylinders nor any other heavy component. Moreover, the operating mechanism of the protective fence, namely the hydraulic cylinder 62 and the linking forks 68, 70, do not comprise big moving parts that project away from the bus, and it is consequently less likely that a child will get his fingers stuck in the mechanism.

I claim:

1. A protective fence for use ahead of a school bus defining a front end, said protective fence comprising:

a) an elongated frame member, destined to be securingly attached horizontally to the school bus front end;

b) a first and a second elongated lightweight arms having respective inner and outer ends, said inner ends being pivotally attached to opposite ends of said elongated frame member for pivoting movement of said first and second arms between respective retracted and extended positions around respective laterally spaced-apart parallel pivoting axes;

c) power means, carried by said frame member, for selectively pivoting said first and second arms sequentially from said retracted to said extended position and from said extended to said retracted position; and d) a foldable semi-rigid lightweight band attached, in an articulated fashion, to the respective outer ends of said first and second arms; said first and second arms being adjacent to said frame member at said retracted position, with said first arm overlapping said second arm, and projecting away from said frame member at said extended position; wherein a lightweight fence assembly is formed in ground overhanging fashion in said extended position.

2. A protective fence as defined in claim 1, wherein said semi-rigid band is extended into a straight position between the respective outer ends of said first and second arms when said arms are in one of said retracted and extended positions.

3. A protective fence as defined in claim 1, wherein said first and second arms alternately pivot from said retracted position to said extended position, and alternately pivot in the opposite order from said extended to said retracted position.

4. A protective fence as defined in claim 3, wherein said power means applies a force eccentrically and simultaneously on said first and second arms when activated, the leverage of said power means on said first arm being greater than the leverage of said power means on said second arm in said retracted position to allow said first arm to pivot before said second arm towards said extended position, and the leverage of said power means on said first arm being lesser than the leverage of said power means on said second arm in said extended position to allow said second arm to pivot before said first arm towards said retracted position.

5. A protective fence as defined in claim 4, wherein said power means consists of an electrical motor mounted on a hydraulic cylinder, the latter mounted to said frame member to be movable therealong, said hydraulic cylinder being linked at both its extremities to said first and second arms through the instrumentality of link members.

6. A protective fence as defined in claim 5, further comprising a hook member mounted for relative movement to said frame member and pivotally and releasably biased towards an outwardly projecting perpendicular position, relative to said frame member, said band having an aperture cut through it, said hook member registering with and extending through said aperture in said band when said first and second arms are in said retracted position for a retaining engagement of said first arm in said retracted position.

7. A protective fence as defined in claim 6, wherein the opposite ends of said semi-rigid band can rotate at each said outer end of said first and second arms around an axis parallel to the pivoting axes of said first and second arms.

8. A protective fence as defined in claim 7, wherein said first and second arms define upper and lower longitudinal rods forming a substantially vertical plane; said protective fence further comprising shock absorbers fixedly attached to said frame member and outwardly projecting therefrom and being laterally spaced thereon by a distance greater than the length of said semi-rigid band, said shock absorbers being positioned between said longitudinal rods of said first and second arms and extending beyond said vertical plane of said first arm, when the latter is in said retracted position.

9. A protective fence as defined in claim 5, further including plate members supporting said hydraulic cylinder, said frame member comprising several longitudinal slots for sliding engagement therein of said plate members for allowing independent movement of said link members.

10. A method of use of a protective fence for mounting ahead of a school bus, the fence comprising a pair of first and second elongated arms pivotally mounted at their inner ends to opposite ends of an elongated support frame and supporting at their outer ends a foldable strip, the support frame being carried horizontally against the school bus front end, and a power output assembly carried by the support frame; said method comprising the following steps:

a) energizing said power assembly;

b) pivoting said first arm away from said support frame, from a position approximately parallel to the support frame to an operative position substantially transverse thereto;

c) pivoting said second arm away from said support frame, from a position approximately parallel to the support frame to an operative position substantially transverse thereto, while concurrently carrying said foldable strip in the process, to bring the strip from an extended position closely adjacent and about parallel to said support frame to an extended farthest ahead from said support frame, wherein said fence occupies an operative condition;

d) pivoting back said second arm inwardly toward and against said support frame; and e) pivoting back said second arm inwardly toward and against said second arm while concurrently carrying said foldable strip again in the process, to return to its position closely adjacent and about parallel to said support frame.

11. A method of use as in claim 10, wherein in steps (b) and (c), said arms operative positions are brought by the pivotal motion to a condition orthogonal to said support frame.

* * * * *